United States Patent [19]

Gibard

[11] 4,064,096
[45] Dec. 20, 1977

[54] CURABLE, STORAGE-STABLE LIQUID ORGANOPOLYSILOXANE COMPOSITIONS

[75] Inventor: Andre Gibard, Venissieux, France

[73] Assignee: Rhone-Poulenc Industries, Paris, France

[21] Appl. No.: 656,735

[22] Filed: Feb. 9, 1976

[30] Foreign Application Priority Data

Feb. 10, 1975 France .............................. 75.04046

[51] Int. Cl.$^2$ ............................................ C08L 83/04
[52] U.S. Cl. ................................................ 260/37 SB
[58] Field of Search .................................... 260/37 SB

[56] References Cited

U.S. PATENT DOCUMENTS

| | | | |
|---|---|---|---|
| 3,642,685 | 2/1972 | Matherly | 260/37 SB |
| 3,933,729 | 1/1976 | Letoffe | 260/37 SB |

Primary Examiner—Lewis T. Jacobs
Attorney, Agent, or Firm—Bacon & Thomas

[57] ABSTRACT

Curable, storage-stable liquid organopolysiloxane compositions are formulated by [A] admixing (a) a diorganopolysiloxane oil having a viscosity ranging from between 400 and 3,000 cps at 25° C., said diorganopolysiloxane being terminated at its chain ends with a moiety selected from the group consisting of $(CH_3)_3SiO_{0.5}$, $(CH_3)_2CH_2=CHSiO_{0.5}$ and $(CH_3)_2C_6H_5SiO_{0.5}$, and the organo radicals comprising the said diorganopolysiloxane being selected from the group consisting of methyl, vinyl and phenyl, with (b) silica having a specific surface area in excess of 80 m$^2$/g, (c) water, and (d) a Si-N bonded silylating agent; [B] next devolatilizing the mixtures [A]; and thence [C] admixing with the devolatilized product [B], (e) an $\alpha,\omega$-dihydroxypolysiloxane oil having a viscosity ranging from between 2,000 and 60,000 cps at 25° C. and (f) an inorganic filler. Organopolysiloxane elastomers useful as molding compositions are prepared by curing the aforesaid formulations.

16 Claims, No Drawings

CURABLE, STORAGE-STABLE LIQUID ORGANOPOLYSILOXANE COMPOSITIONS

BACKGROUND OF THE INVENTION

1. Field of the Invention

The present invention relates to a process for the preparation of certain silicone elastomers upon addition of certain alkoxylated organosilicon cross-linking agents, together with certain metal catalysts, to certain storage-stable polysiloxane compositions.

More especially, this invention relates to the reinforcing of such polysiloxane compositions with silica fillers having high specific surface area, and which have been treated, in the presence of water, with certain Si-N bonded silylating agents, in such diorganopolysiloxane oils having viscosities in the range of from between about 400 to 3,000 cps at 25° C., said reinforcing fillers and the various parameters for the treatment thereof being selected from within certain well-defined limits.

The organopolysiloxane compositions thus obtained are storage-stable and, in particular, their viscosities, which are within the range of from about 10,000 cps at 25° C. to 150,000 cps at 25° C., do not change with time; furthermore, even one hour after the addition of the aforementioned cross-linking agents and metal catalysts thereto, same can still readily be cast and are capable therefore of reproducing even the minutest details of the surfaces upon which they have been deposited or cast. The viscosities of the subject compositions, at the end of the noted post-addition period, attain a value at most one and one half times the corresponding value prior to addition of the curing agents.

2. Description of the Prior Art

Numerous processes are known to the state of the prior art which relate to the treatment of finely divided silicas with silazanes or silylamines with a view to improving the properties of the curable organopolysiloxane compositions [and/or elastomers] containing such siliceous fillers.

In general, the silicas are treated hot with a combination of additives which [in addition to the silazanes or the silylamines] comprise water, cyclopolysiloxanes and, optionally, organic amine compounds; this treatment can take place in one or plural stages [compare German published applications Nos. 2,358,784 and 2,359,619]. Given the small amounts of these various additives employed relative to the apparent volume of the silicas to be modified, it is essential, in order to suitably impregnate these pulverulent silicas, to employ bulky leakproof apparatus which is resistant to pressures greater than atmospheric pressure. Furthermore, once same have been impregnated, these silicas are necessarily removed from the aforedescribed apparatus and then transferred into other devices in order to mix them with the necessary organopolysiloxane polymers; while such an operation is technically feasible, it is time-consuming and, further, requires adherence to strict limits because it is essential to prevent the treated silicas from becoming dispersed in the air in the work area. The aforesaid disadvantages thus severely limit the use of processes of this type.

According to another technique [U.S. Pat. No. 3,642,685 and British Patent Specification No. 1,024,234], it is possible to treat siliceous or non-siliceous inorganic fillers directly with Si-N bonded organosilicon compounds in diorganopolysiloxane polymers having various viscosities. This process avoids the above-mentioned disadvantages but, nevertheless, it only permits organopolysiloxane compositions having viscosities which do not vary with time to be produced with great difficulty because of the proportions of the reactants required to be present or even because of the choice of the diorganopolysiloxane polymers themselves. Additionally, if compositions of this type are prepared they are only very rarely able to flow or otherwise be worked one hour after the addition of appropriate cross-linking agents and catalysts thereto.

SUMMARY OF THE INVENTION

It has now been determined according to the present invention that the foregoing and other disadvantages characterizing the state of this art can be obviated by the novel technique for the preparation of storage-stable liquid organopolysiloxane compositions, according to which [all parts being expressed as parts by weight]:

[A] The following ingredients are brought into intimate contact for at least 2 hours at a temperature below 60° C:
  a. A diorganopolysiloxane oil having a viscosity in the range of from 400 cps at 25° C. to 3,000 cps at 25° C., said diorganopolysiloxane being chain terminated at both ends by a chain terminator of the formulae $(CH_3)_3SiO_{0.5}$, $(CH_3)_2CH_2=CHSiO_{0.5}$ and $(CH_3)_2C_6H_5SiO_{0.5}$, and the organic radicals linked to the silicon atoms of the polymer chain are selected from the group consisting of methyl, vinyl and phenyl radicals in the numerical proportion or content of 40 to 100% methyl, 0 to 58% phenyl and 0 to 2% vinyl,
  b. A silica filler having a specific surface area greater than 80 $m^2/g$,
  c. Water, and
  d. A Si-N bonded silylating agent selected from those of the formulae $R(CH_3)_2SiNH-Si(CH_3)_2R$ and $R(CH_3)_2SiNHR'$ in which the symbols R, which may be identical or different, represent methyl, ethyl, vinyl and phenyl radicals and the symbol R' represents a methyl or ethyl radical.

[B] The mixture obtained under [A], supra, is then devolatilized by heating same at a temperature within the range of 70° C. to 200° C. under a pressure of, at most, atmospheric pressure.

[C] Finally, the following additives are introduced into 100 parts of the devolatilized mixture obtained under [B]:
  e. 45 to 120 parts of a dimethylpolysiloxane oil bearing terminal hydroxyl groups and having a viscosity within the range of from 2,000 cps at 25° C. to 60,000 cps at 25° C., and
  f. 25 to 120 parts of an inorganic filler.

DETAILED DESCRIPTION OF THE INVENTION

The foregoing process [A], [B] and [C] is characterized:

1. in that the reactants described under [A] are advantageously mixed in the proportion of 100 parts of diorganopolysiloxane oil (*a*) per 30 to 75 parts of silica (*b*), 1.5 to 7 parts of water (*c*) and 4 to 18 parts of silylating agent (*d*), and (2) in that the inorganic filler (*f*) is a silica having a specific surface area of less than 50 $m^2/g$.

The diorganopolysiloxane oil (*a*) having a vicosity ranging from 400 cps at 25° C. to 3,000 cps at 25° C. and, preferably, from 500 cps at 25° C. to 2,500 cps at 25° C., consists, in addition to its terminal triorganosiloxy groups, essentially of diorganosiloxy units selected from the group consisting of those of the formulae $(CH_3)_2SiO$, $CH_3(C_6H_5)SiO$, $(C_6H_5)SiO$, $(CH_3)CH_2=CHSiO$ and $C_6H_5(CH_2=CH)SiO$, these units being so combined that the total number of methyl, vinyl and phenyl radicals present in the polymer chain of the oil falls within the range of percentages previously mentioned. However, the additional presence in this oil of minimal quantities, at most 1% in number, of monoorganosiloxy units of the formula $R''SiO_{1.5}$, wherein the symbol $R''$ represents a methyl, vinyl or phenyl radical, is not excluded, and thus is also within the scope of the invention.

This oil is freely available as an off-the-shelf item from silicone manufacturers, but can furthermore be easily prepared by polymerization and rearrangement, utilizing either alkaline or acid catalysts, of a suitable mixture of diorganocyclopolysiloxanes and linear diorganopolysiloxanes of low molecular weight [French Pat. No. 1,108,764 and U.S. Pat. Nos. 2,875,172 and 2,954,357]. By way of illustration, diorganocyclopolysiloxanes which may be mentioned include hexamethylcyclotrisiloxane, octamethylcyclotetrasiloxane, tetramethyltetravinylcyclotetrasiloxane, octaphenylcyclotetrasiloxane, and trimethyltriphenylcyclotrisiloxane. The linear diorganopolysiloxanes can correspond, for example, to those of the formula

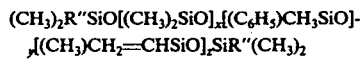

in which the symbols $R''$, which may be identical or different, have the above-mentioned meaning, the symbol $x$ represents any number ranging from 0 to 15, the symbol $y$ represents any number ranging from 0 to 7 and the symbol $z$ represents any number ranging from 0 to 2.

The silica (b) having a specific surface area greater than 80 m²/g is desirably selected from the group consisting of pyrogenic silicas, silica aerogels and xerogels, and precipitated silicas; the mean particle diameter of these fillers is less than 0.1 micron and their specific surface area can exceed 300 m²/g; same generally contain from 0.4 to 8% of adsorbed water.

The silylating agent (d) is selected from the group consisting of the disilazanes of the above-mentioned formula $R(CH_3)_2SiNHSi(CH_3)_2R$ and the silylamines of the above-mentioned formula $R(CH_3)_2SiNHR'$.

The disilazanes can easily be prepared by reaction of ammonia with a triorganochlorosilane of the formula $R(CH_3)_2SiCl$ or a mixture of two triorganochlorosilanes, each of which also corresponds to the noted formula, but with the radical R in the one formula being different from that in the formula of the other.

The silylamines can be prepared by reaction of N-methylamine or N-ethylamine with a triorganochlorosilane of the formula $R(CH_3)_2SiCl$; this reaction can be carried out in an organic solvent medium such as toluene, xylene, carbon tetrachloride or diethyl ether [Gmelins Handbuch der anorganischen Chemie, part C, pages 310 to 313 (1958)].

By way of illustration, disilazanes and silylamines which can be used in accordance with the process of the invention are reflected by the following structural formulae:

$(CH_3)_3SiNHSi(CH_3)_3$
$(CH_3)_3SiNH-Si(CH_3)_2CH=CH_2$
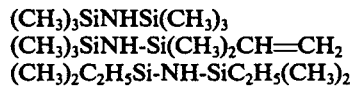
$(CH_3)_2C_6H_5Si-NH-Si(CH_3)_3$
$(CH_3)_3SiNHCH_3$
$(CH_3)_3SiNHC_2H_5$
$(CH_3)_2CH_2=CHSiNHCH_3$
$(CH_3)_2C_2H_5SiNHC_2H_5$
$(CH_3)_2C_6H_5SiNHCH_3$ The dimethylpolysiloxane oil (e) having terminal hydroxyl groups, and having a viscosity ranging from 2,000 cps at 25° C. to 60,000 cps at 25° C. and preferably from 3,000 cps at 25° C. to 50,000 cps at 25° C. consists essentially of units of the formula $(CH_3)CH_2=CHSiO$ and/or $CH_3SiO_{1.5}$, to the extent of at most 1% by number, is not excluded according to the invention.

The dimethylpolysiloxane oil is manufactured on an industrial scale by manufacturers of silicones but can furthermore be prepared by techniques which to date have been fully developed. One such technique consists of polymerizing a dimethylcyclopolysiloxane or a mixture of dimethylcyclopolysiloxanes by means of catalytic amounts of alkaline or acid reagents, the polymer obtained being then treated with water in higher amounts, the lower being the intended viscosity of the oil which is to be prepared; finally, the oil is isolated by eliminating, at a temperature which is generally above 100° C. and under a pressure which is preferably below atmospheric pressure, the dimethylcyclopolysiloxane starting material or materials present in the reaction equilibrium, as well as any other polymers of low molecular weight which may be formed during this reaction.

It is advisable to neutralize the alkaline or acid reagents used as polymerization catalysts before distilling the volatile products, which represent about 8 to 20% by weight of the oil.

The silica (f) having a specific surface area less than 50 m²/g is preferably selected from the group consisting of diatomaceous silicas and ground quartz silica, and these pulverulent materials generally have mean particle diameters greater than 0.1 micron and contain about 0.1 to 4% of adsorbed water.

As heretofore mentioned, the preparation of the storage-stable liquid organopolysiloxane compositions is carried out in several stages. In the first stage [A], a mixture is formed which comprises, per 100 parts of diorganopolysiloxane oil (a), 30 to 75 parts, and preferably 35 to 70 parts, of the silica (b), 1.5 to 7 parts, preferably 2 to 6 parts, of water (c), and 4 to 18 parts, and preferably 5 to 15 parts, of the silylating agent (d). The order in which these various reactants are incorporated is optional but it is more practical to first introduce the oil (a) into the appropriate reactor and then successively incorporate into the oil the silica (b), the water (c) and the silylating agent (d); in fact, the silica, because of its low apparent density, occupies a large volume and it is therefore preferable to gradually disperse the silica in the total amount of the oil employed, so as to reduce any objectionably large volume. Once this dispersion has been completed, the water and the silylating agent are added; preferably, the water is added before the silylating agent for the purpose of facilitating the subsequent action of the silylating agent on the silica. In order to prevent the entry of water from atmospheric humidity into the system, or simply to avoid the hazards of inflammability, it is advisable to prepare this mixture in the presence of an atmosphere or blanket of an inert gas, such as nitrogen. The mixture is stirred, for example, in a malaxator, for at least 2 hours, and preferably for at least 3 hours, at a temperature not exceeding 60° C. and preferably not exceeding 40° C. As stirring of any viscous or pasty products generates frictional heat, it is sometimes necessary to provide the stirring device with a cooling system so as not to exceed the prescribed temperature of 60° C.

In the second stage [B], the volatile materials of the mixture are removed by heating the mixture to about 70°-200° C., preferably 90°-165° C., under a pressure of the order of atmospheric pressure. During this devolatilization, the materials eliminated are principally ammonia, or N-methylamine, or N-ethylamine, traces of water, possibly residues of silylating agent and small amounts of diorganopolysiloxane polymers of relatively low molecular weight, such as hexamethyldisiloxane, hexamethylcyclotrisiloxane, trimethyltriphenylcyclotrisiloxane and octamethylcyclotetrasiloxane. This devolatilization stage must be continued until samples taken from the mixture no longer contain traces of alkalinity.

In order to accelerate the devolatilization, it is advisable to sweep the atmosphere in the reactors, throughout the heating period, with a stream of inert gas; however, other techniques can be employed, for example, the use of pressures below atmospheric pressure, of the order of, for example, 10 to 30 mm of mercury.

In the third stage [C], the devolatilized mixture [which has the appearance of a more or less viscous fluid, having a viscosity of at most 300,000 cps at 25° C.] is mixed with 45 to 120 parts, preferably 48 to 115 parts, of the hydroxylic dimethylpolysiloxane oil (e) and 25 to 120 parts, preferably 30 to 115 parts, of the silica (f) having a specific surface area less than 50 m²/g, per 100 parts of the first-mentioned devolatilized mixture. The dispersion of the hydroxylic oil (e) and the silica (f) can be achieved by simple stirring at ambient temperature under atmospheric pressure; in that case, it is advisable to maintain an atmosphere of inert gas in the malaxating vessels. The order in which the ingredients (e) and (f) are incorporated is optional because the silica (f) generally has an apparent density 50 to 80 times higher than that of the silica of large specific surface area (b); if the mixture is sufficiently viscous it is at times advisable, in order to more rapidly attain a homogeneous composition, to add to the devolatilized mixture only a fraction of the amount of the silica (f) employed, to charge therein the total amount of the oil (e) and thence to finally add the remaining required fraction of the silica (f).

In addition to the hydroxylic oil (e) and the silica (f) it is possible to add, at the same time as these two ingredients, an $\alpha,\omega$-dihydroxydiorganopolysiloxane oil having a relatively low viscosity which falls within the range of 5 to 100 cps at 25° C.; the purpose of this oil is to dilute the mixture, and it thus provides slightly more fluid compositions. The amounts incorporated are low and represent from 0.5% to 6% of the weight of the hydroxylic oil (e). The organic radicals linked to the silicon atoms of the polymer chain of this oil are selected from among methyl, phenyl and vinyl radicals; at least 45% of these radicals being methyl radicals, at most 50% of these radicals being phenyl radicals and at most 10% of these radicals being vinyl radicals.

Furthermore, in order to assist the subsequent curing of the topic compositions, water can be incorporated at the rate of at most 1% of the weight of the oil (e); the introduction of water is markedly advisable if the fillers (b) and (f) only contain minimal amounts of adsorbed water; in this event, water is preferably added in the form of a dispersion [containing from 1 to 6% by weight of water] in a mixture consisting, for example, of equal amounts by weight of the oil (e) and the silica (f).

As above indicated, the compositions obtained are characterized by a large range of viscosity values, extending from 10,000 cps at 25° C. to 150,000 cps at 25° C. They can, accordingly, range from slightly viscous to viscous liquids, the degree of viscosity obviously depending upon the ultimate use for which they are intended; regardless of their viscosity, they have the property that their original viscosity remains constant with time, a property which is desirable in numerous fields of application, such as molding and coating.

These storage-stable compositions contain neither cross-linking agents nor curing catalysts and must thus be admixed therewith at the time of use.

Cross-linking agents which most advantageously can be used are selected from the following:

i. Monomers of the formula $Q_wSi[(OCH_2CH_2)_tOG]_{4-w}$ in which the symbol Q represents a hydrocarbon radical having from 1 to 8 carbon atoms, the symbol G represents an alkyl radical having from 1 to 4 carbon atoms and the symbols $w$ and $t$ represent 0 or 1, and ii. polymers resulting from the partial hydrolysis of the monomers of the formula $Si(OG)_4$, the symbol G being as aforesaid.

As specific examples of hydrocarbon radicals having from 1 to 8 carbon atoms and represented by the symbol Q, there are mentioned:

Alkyl radicals having from 1 to 3 carbon atoms, such as methyl, ethyl, propyl and isopropyl radicals, alkenyl radicals having from 2 to 3 carbon atoms, such as vinyl and allyl radicals, and aryl radicals having from 6 to 8 carbon atoms, such as phenyl, tolyl and xylyl radicals.

As specific examples of alkyl radicals having from 1 to 4 carbon atoms and represented by the symbol G, there are mentioned methyl, ethyl, propyl, isopropyl and butyl radicals.

By way of illustration, monomers which may be employed [either separately or in admixture] are methyltrimethoxysilane, methyltriethoxysilane, methyltriisopropoxysilane, vinyltrimethoxysilane, vinyltriethoxysilane, phenyltrimethoxysilane, methyltris(methoxyethoxy)silane, ethyltris(methoxyethoxy)silane, vinyltris(methoxyethoxy)silane, propyltris(methoxyethoxy)silane, phenyltris(methoxyethoxy)silane, methyl silicate, ethyl silicate, propyl silicate, isopropyl silicate, butyl silicate, $\beta$-(methoxy)-ethyl silicate and $\beta$-(ethoxy)-ethyl silicate.

The polymers resulting from the partial hydrolysis of the alkyl silicate of the formula $Si(OG)_4$ consist mainly of units of the formula $Si(OG)_2O$, with a low proportion of units of the formulae $(GO)_3SiO_{0.5}$, $GOSiO_{1.5}$ and $SiO_2$.

The characterization of the polymers is usually based on their content of alkoxy groups and of the silica, but it is frequently easier to determine the silica, by total hydrolysis of a sample, than to determine alkoxy group content. The methods for the preparation of the polymers are well known and are described in particular in the work "Chemistry and Technology of Silicones" by W. Noll - pages 648 to 653. It is, however, necessary that the polymers obtained, in order to be compatible with, and/or capable of reacting with the compositions of the invention, still retain the ability to dissolve in the usual hydrocarbon solvents, such as toluene, xylene and methylcyclohexane in an amount of at least 50 parts of polymers per 100 parts of solvent These cross-linking agents are utilized in conjunction with metal catalysts which are selected from the group consisting of organic derivatives of tin, metal salts of carboxylic acids and polymers comprising

linkages.

As suitable organic derivatives of tin, there are mentioned (1) the organo-tin salts of monocarboxylic or polycarboxylic acids, for example, dibutyl-tin dilaurate or dioctyl-tin dilaurate, dibutyl-tin di-(2-ethylhexanoate) or dioctyl-tin di-(2-ethylhexanoate), tributyl-tin 2-ethylhexanoate, dibutyl-tin succinate and dioctyl-tin maleate, and (2) the compounds of the formula $T_2Sn(S.CH_2COOT)_2$, in which the symbols T, which may be identical or different, represent alkyl radicals having from 3 to 20 carbon atoms, such as the propyl, butyl, hexyl, octyl, isooctyl, decyl, dodecyl and octadecyl radicals. By way of illustration, these compounds can correspond to the formulae $(n-C_4H_9)_2Sn(SCH_2COOiso-C_8H_{17})_2$ and $(n-C_8H_{17})_2Sn(SCH_2COOiso-C_8H_{17})_2$. The preparation of such compounds is set forth, for example, in Canadian Pat. No. 846,201 and French Pat. Nos. 1,477,892 and 1,488,631.

As metal salts of carboxylic acids, there are mentioned lead 2-ethylhexanoate, iron 2-ethylhexanoate, tin-2-ethylhexanoate, lead naphthenate, cobalt naphthenate and iron naphthenate.

Polymers comprising the

moieties include those prepared by reaction of alkyl titanates, wherein the alkyl radicals have from 3 to 10 carbon atoms, with the organo-tin salts of the monocarboxylic or polycarboxylic acids above mentioned. Such polymers are characterized in French Pat. No. 1,392,648. and British Pat. Specification No. 928,496.

Per 100 parts of the compositions according to the process of the invention, it is advisable to use, firstly, from 0.3 to 2.5 parts, preferably 0.4 to 2 parts, of the cross-linking agents just described, and, secondly, from 0.1 to 2.2 parts, and preferably from 0.2 to 1.8 parts, of the above-mentioned metal catalysts. As these quantities are sufficiently low it is frequently convenient to use these cross-linking agents and these catalysts in a dilute form, and in particular they can be diluted together, or separately, to concentrations of 5 to 45% by weight, in diorganopolysiloxane oils of the type of the oils (a) having a viscosity ranging from 400 cps at 25° C. to 3,000 cps at 25° C. It is even advisable, in order to facilitate their dispersion in the compositions of the invention, to use, as diluents, diorganopolysiloxane oils which uniformly have the same structure as the oils (a), but have an even lower viscosity, for example, of the order of 5 to 50 cps at 25° C.

The compositions of the invention have the ability to still remain liquid one hour after the addition of the above-mentioned cross-linking agents and catalysts. Thus, the value of the viscosity of each of these compositions, after this period of one hour, at most attains one and one half times the value measured before the said addition and thus essentially falls within the range 10,000 to 225,000 cps at 25° C. This ability to display only a slight increase in viscosity upon commencing introduction of the curing system of cross-linking agents and catalysts enables the compositions to be used in very special applications which require products which spread very well, for example:

The manufacture of molds with complicated relief patterns, such as molds which reproduce [in synthetic resins], fascia boards and objects d'art, the potting of electronic equipment, and the coating of engraved metal surfaces.

The compositions of the invention can, moreover, be used in more conventional fields such as the caulking of boat bridges, the jointing of masonry components or double-glazing components, the leakproofing of electronic household equipment and sanitary equipment, gluing of ceramics and earthenware, and coating of textile materials or cellulosic materials. These casting compositions can be converted into compositions which do not flow [in particular for the jointing of vertical surfaces or the taking of impressions of vertical architectural items] by simple addition of suitable gelling agents such as hydrogenated castor oils. These agents are generally introduced in an amount of 1 to 4% of the weight of the compositions.

The elastomers resulting from the curing of the compositions of the invention have good mechanical properties and, in particular, excellent tear resistance which enables same to remarkably well resist the spread of tears which have begun to develope.

In order to further illustrate the present invention and the advantages thereof, the following specific examples are given, it being understood that same are intended only as illustrative and in nowise limitative, and wherein all percentages are given by weight.

EXAMPLE 1

The following ingredients were successively introduced [with the malaxating arms in operation] into an 18 l malaxator equipped with solid-paddle malaxating arms which was maintained under an inert atmosphere by passing a slight stream of nitrogen through the equipment:

3,000 g of dimethylpolysiloxane oil having a viscosity of 1,000 cps at 25° C., said dimethylpolysiloxane being chain terminated at either end with a group of the formula $(CH_3)_3SiO_{0.5}$, 1,200 g of a pyrogenic silica having a specific surface area of 200 m²/g, and containing 1.5% of adsorbed water, 96 g of distilled water, and 240 g of hexamethyldisilazane.

This mixture was stirred for 6 hours at ambient temperature; it was then freed from its volatile components by heating the mass at about 155° C. for 6 hours. Throughout the period of heating a stream of nitrogen was passed through the malaxator at a flow rate of 200 l/hour.

The following ingredients were successively added to the above mixture, which had then been cooled to about 80° C.:

3,000 g of a ground quartz having a mean particle diameter of 5 microns and a specific surface area of about 15 m²/g, and containing 1% of adsorbed water, 3,000 g of an α,ω-dihydroxydimethylpolysiloxane oil having a viscosity of 16,000 cps at 25° C., and 52 g of an α,ω-dihydroxydimethylpolysiloxane oil having a viscosity of 50 cps at 25° C.

The entire mass was malaxated for 2 hours; the organopolysiloxane composition thus formed was then vigorously ground by passing same through a triple-roll mill held under hyraulic pressure, each cylinder thereof having a diameter of 120 mm and the pressures applied being 10 and 20 kg/cm$^2$.

A sample of this composition was divided into two parts and on one of the parts the Brookfield viscosity values were measured immediately, at different speeds of stirring; it was thus found that the freshly prepared composition had a Brookfield viscosity [needle No. 6] of 42,000 cps at 25° C. at a speed of 5 revolutions per minute and of 38,000 cps at 25° C. at a speed of 20 revolutions per minute. The remaining portion of the sample was stored for 6 months in sealed aluminum tubes and at the end of this period it was found that the Brookfield viscosity values at 5 revolutions per minute and 20 revolutions per minute, respectively, were substantially the same as those previously determined, so that the viscosity of the composition did not change during storage.

Next, 1,000 g. of the aforementioned composition were mixed with 47 g of a curing agent system consisting of:

35 g [as the diluent] of a dimethylpolysiloxane oil having a viscosity of 20 cps at 25° C., chain terminated at either end by a group of the formula $(CH_3)_3SiO_{0.5}$, 7 g [as the organo-silicon cross-linking agent] of a n-propyl polysilicate containing 34% of silica, and 5 g [as the metal catalyst] of dibutyl-tin dilaurate.

Mixing was carried out by simple stirring with an anchor-type stirrer. A composition was obtained which was curable at ambient temperature and which, 60 minutes after its preparation, had a Brookfield viscosity [needle No. 6] of 48,000 cps at 25° C. at a speed of 5 revolutions per minute, and of 42,000 cps at 25° C. at a speed of 20 revolutions per minute.

This composition was spread into a layer about 2 mm thick on glass plates which had been rendered slightly antisticking by prior application of a commercial detergent. The rubbery films formed, detached from the plates 24 hours after depositing the composition, were then left for 4 days at ambient temperature [temperature 20° C., relative humidity 50%]. At the end of this period, their mechanical properties displayed the following values:

Shore A hardness [measured in accordance with standard specification NF T 51-109]:23.

Tensile strength in kg/cm$^2$ [measured according to standard specification NF T 46-002, the samples being of the dumbbell type]:37.

Elongation at break in % [measured at the same time as the tensile strength]:350.

Tear strength in kg/cm [measured according to standard specification NF T 46-007]:24.

EXAMPLE 2

The following ingredients were successively introduced into the apparatus described in Example 1:

3,000 g of a dimethylpolysiloxane oil having a viscosity of 1,800 cps at 25° C., chain terminated with a terminal group of the formula $(CH_3)_2CH_2=CHSiO_{0.5}$ at each end of the polymer, 1,500 g of a pyrogenic silica having a specific surface area of 300 m$^2$/g, and containing 1.9% of adsorbed water, 140 g of distilled water, and 280 g of the disilazane of the formula $(CH_3)_3SiNH-Si(CH_3)_2CH=CH_2$.

The mixture was stirred for 7 hours under ambient temperature and was then heated to 165° C. and maintained at this temperature for 5 hours. During this period of heating, a stream of nitrogen was passed through the malaxator at a flow rate of 250 l/hour so as to purge all the volatile products.

The following ingredients were next successively introduced into this mixture which had then been cooled to about 70° C.:

2,500 g of a ground quartz having a mean particle diameter of 7 microns and a specific surface area of about 10 m$^2$/g. and containing 1.3% of adsorbed water, 2,800 g of an α,ω-dihydroxydimethylpolysiloxane oil having a viscosity of 25,000 cps at 25° C., and 80 g of an α,ω-dihydroxydimethylpolysiloxane oil having a viscosity of 20 cps at 25° C.

The entire mass was malaxated for 3 hours at ambient temperature and the organopolysiloxane composition obtained was then ground by passing same through the mill described in Example 1.

This resultant composition had a Brookfield viscosity [needle No. 6] of 58,000 cps at 25° C. at a speed of 5 revolutions per minute and of 53,000 cps at 25° C. at a speed of 20 revolutions per minute.

1,000 g of this composition were mixed with 22 g of a curing agent system consisting of:

12 g [as the diluent] of a dimethylpolysiloxane oil having a viscosity of 20 cps at 25° C., chain terminated at either chain end with a group of the formula $(CH_3)_3SiO_{0.5}$, 6 g [as the organo-silicon cross-linking agent] of hexapropoxydisiloxane, and 4 g [as the metal catalyst] of dibutyl-tin diacetate.

There resulted a composition which was curable at ambient temperature and which, 60 minutes after its preparation, had a Brookfield viscosity [needle No. 6] of 63,000 cps at 25° C. at a speed of 5 revolutions per minute and of 57,000 cps at 25° C. at a speed of 20 revolutions per minute.

On spreading this composition as a 2 mm thick layer on glass plates, films of a rubbery consistency were obtained after 24 hours' exposure to the atmosphere. These films were detached at the end of this period of 24 hours and their mechanical properties were measured after 4 days of atmospheric exposure aging. The results of the measurements were as follows:

| | |
|---|---|
| Shore A hardness | 27 |
| Tensile strength | 44 kg/cm$^2$ |
| Elongation at break | 430% |
| Tear strength | 26 kg/cm |

EXAMPLE 3

The following ingredients were successively introduced into the apparatus described and used in Example 1:

2,800 g of methylphenylpolysiloxane oil having a viscosity of 800 cps at 25° C., consisting of units of the formula $(CH_3)C_6H_5SiO$, with a terminal group of the formula $(CH_3)_3SiO_{0.5}$ at each end of its chain, 1,700 g of a pyrogenic silica having a specific surface area of 130 m$^2$/g, and containing 2% of adsorbed water, 110 g of distilled water, and 300 g of the silylamine of the formula $(CH_3)_3SiNHCH_3$.

The mixture was malaxated for 8 hours at ambient temperature and was then heated to 150° C. and there maintained for 7 hours. During this period of heating, a stream of nitrogen was passed through the malaxator at a flow rate of 200 l/hour so as to purge the volatile products.

The following ingredients were next successively added to the aforesaid mixture after it had been cooled to about 60° C:

2,800 g of a ground quartz having a mean particle diameter of 5 microns and a specific surface area of about 15 m²/g, and containing 1% of adsorbed water, 3,100 g of an α,ω-dihydroxydimethylpolysiloxane oil having a viscosity of 20,000 cps at 25° C., and 70 g of an α,ω-dihydroxydimethylpolysiloxane oil having a viscosity of 20 cps at 25° C.

The entire mass was malaxated for 2 hours at ambient temperature and the organopolysiloxane composition obtained was then ground by passing same through the mill described in Example 1. After this treatment the composition had a Brookfield viscosity [needle No. 6] of 51,000 cps at 25° C. at a speed of 5 revolutions per minute, and of 45,000 cps at 25° C. at a speed of 20 revolutions per minute.

20 g of hydrogenated castor oil [sold under the tradename "Thixcin R" by The Baker Castor Oil Company] were malaxated with 1,000 g of the foregoing composition for 1 hour at ambient temperature.

The composition resulting therefrom was ground by passing it through the mill described in Example 1 and then left in an oven, heated to 70° C. for 4 hours. The composition thus formed was thixotropic; when left in a vertical position it exhibited virtually no flow at ambient temperature.

47 g of the curing agent system described in Example 1 were added to 1,000 g of this trixotropic composition and the catalyzed composition was then spread on glass plates in the manner indicated in Example 1.

After remaining for 24 hours at ambient temperature the rubbery films formed were removed from their base plates and the values of their mechanical properties were measured after 4 days of aging under ambient temperature. These values were as follows:

| Shore A hardness | 25 |
| --- | --- |
| Tensile strength | 40 kg/cm² |
| Elongation at break | 450% |
| Tear strength | 20 kg/cm |

While there have been described and pointed out the fundamental novel features of the invention as applied to the preferred embodiments thereof, those skilled in the art will appreciate that various modifications, changes and omissions in the curable, storage-stable liquid organopolysiloxane compositions illustrated and described can be made without departing from the spirit of the invention. It is the intention, therefore, to be limited only by the scope of the following claims.

What is claimed is:

1. A method for the formulation of a curable, storagestable liquid organopolysiloxane composition of matter, which method comprises admixing for at least two hours at a temperature of less than about 60° C. (a) 100 parts by weight of a diorganopolysiloxane oil having a viscosity ranging from between 400 and 3,000 cps at 25° C. wherein the organo radicals comprising the said diorganopolysiloxane are selected from the group consisting of methyl, vinyl and phenyl and are at least 40% methyl, up to 58% phenyl and up to 2% vinyl, said diorganopolysiloxane being terminated at its chain ends with a moiety selected from the group consisting of $(CH_3)_3SiO_{0.5}$, $(CH_3)_2CH_2=CHSiO_{0.5}$ and $(CH_3)_2C_6H_5SiO_{0.5}$, with (b) 30 to 75 parts by weight of silica having a specific surface area in excess of 80²m/g, (c) 1.5 to 7 parts by weight of water, and (d) 4 to 18 parts by weight of a Si-N bonded silylating agent selected from the group consisting of $R(CH_3)_2SiNH-Si(CH_3)_2R$ and $R(CH_3)_2SiNHR'$, wherein each R is either the same or different and is methyl, ethyl, vinyl or phenyl, and R' is methyl or ethyl; next devolatilizing the mixture at a temperature of from about 70° C. to 200° C. under a pressure no greater than atmospheric; and thence admixing with the devolatilized product, 45 to 120 parts of (e) an α,ω-dihydroxypolysiloxane oil having a viscosity ranging from between 2,000 and 60,000 cps at 25° C. and 25 to 120 parts by weight of (f) a filler which is a silica having a specific surface area of less than 50 m²/g.

2. The method as defined by claim 1, wherein the α,ω-dihydroxypolysiloxane (e) is a dihydroxydimethylpolysiloxane.

3. The method as defined by claim 2, wherein the silica (b) is selected from the group consisting of pyrogenic silica, silica aerogel, silica xerogel and precipitated silica.

4. The method as defined by claim 3, wherein the inorganic filler (f) is selected from the group consisting of diatomaceus silica and ground quartz silica.

5. The method as defined by claim 1, further comprising the addition of from about 1 to 4% by weight of gelling agent to the resultant formulation.

6. The method as defined by claim 5, wherein the gelling agent is hydrogenated castor oil.

7. The method as defined by claim 1, wherein there are additionally admixed from 0.5 to 6.0% by weight of an α,ω-dihydroxydiorganopolysiloxane oil (g) having a viscosity ranging from between 5 and 100 cps at 25° C., based upon the weight of the α,ω-dihydroxypolysiloxane oil (e).

8. The method as defined by claim 1, wherein the diorganopolysiloxane oil (a) has a viscosity between 500 and 2,500 cps at 25° C., the α,ω-dihydroxypolysiloxane oil (e) has a viscosity between 3,000 and 50,000 cps at 25° C., and wherein there are admixed 100 parts by weight of the diorganopolysiloxane oil (a), per 35 to 70 parts by weight of the silica (b), per 2 to 6 parts by weight of the water (c), per 5 to 15 parts of the silylating agent (d).

9. The method as defined by claim 8, wherein there are admixed 48 to 115 parts by weight of the α,ω-dihydroxypolysiloxane oil (e), and 30 to 115 parts by weight of the inorganic filler (f).

10. The method for the preparation of organopolysiloxane elastomers, which method comprises curing the formulation prepared by the process as defined by claim 1.

11. The method as defined by claim 10, wherein the curing is effected by means of catalytic cross-linking.

12. The method as defined by claim 11, wherein the cross-linking agent is a member selected from the group consisting of monomers of the formula $Q_wSi[(OCH_2CH_2)_tOG]_{4-w}$, wherein Q is a hydrocarbon having from 1 to 8 carbon atoms, G is alkyl having from 1 to 4 carbon atoms, and w and t are either 0 or 1, and polymers resulting from the partial hydrolysis of monomers of the formula Si(OG)$_4$, wherein G is as above.

13. The method as defined by claim 12, wherein the catalyst is a metal catalyst selected from the group consisting of organo-tin derivatives, metal salts of carboxylic acids and polymeric ≡TiOSn≡ compositions.

14. The product of the method as defined by claim 1.

15. The product of the method as defined by claim 10.

16. A shaped article comprising the product as defined by claim 15.

* * * * *